United States Patent [19]

Krzystowczyk et al.

[11] Patent Number: 6,034,024
[45] Date of Patent: Mar. 7, 2000

[54] HEAT TREATED ALUMOXANES

[75] Inventors: Niomi L. Krzystowczyk, Orangeburg, S.C.; Steven P. Diefenbach, Baton Rouge, La.; Edward A. Burt, Lexington, S.C.

[73] Assignee: Albemarle Corporation, Richmond, Va.

[21] Appl. No.: 09/069,462

[22] Filed: Apr. 29, 1998

Related U.S. Application Data

[63] Continuation-in-part of application No. 08/807,153, Feb. 27, 1997, abandoned, which is a continuation of application No. 08/644,764, May 10, 1996, Pat. No. 5,739,368.

[51] Int. Cl.[7] .............. B01J 31/00; B01J 37/00; B01J 37/39; C08F 4/02; C08F 4/60
[52] U.S. Cl. ............ 502/107; 502/104; 502/103; 502/117; 502/152; 502/5; 502/522; 556/187; 556/182; 556/179; 556/175
[58] Field of Search ............... 502/5, 104, 107, 502/152, 500, 513, 522; 556/171, 175, 179, 182, 187

[56] References Cited

U.S. PATENT DOCUMENTS

| | | | |
|---|---|---|---|
| 4,960,878 | 10/1990 | Crapo et al. | 556/179 |
| 4,978,730 | 12/1990 | Maezawa et al. | 526/153 |
| 5,001,205 | 3/1991 | Hoel | 526/128 |
| 5,023,304 | 6/1991 | Takeuchi et al. | 526/160 |
| 5,041,584 | 8/1991 | Crapo et al. | 556/179 |
| 5,066,631 | 11/1991 | Sangokoya et al. | 502/152 |
| 5,070,160 | 12/1991 | Tomostsu et al. | 526/165 |
| 5,086,024 | 2/1992 | Crapo et al. | 502/117 |
| 5,227,440 | 7/1993 | Canich et al. | 526/129 |
| 5,229,478 | 7/1993 | Floyd et al. | 526/160 |
| 5,235,081 | 8/1993 | Sangokoya | 556/179 |
| 5,308,815 | 5/1994 | Sangokoya | 502/104 |
| 5,321,189 | 6/1994 | Mueller et al. | 585/512 |
| 5,340,892 | 8/1994 | Kuramoto | 526/119 |
| 5,416,178 | 5/1995 | Winter et al. | 526/160 |
| 5,441,920 | 8/1995 | Welborn, Jr. | 502/103 |
| 5,449,746 | 9/1995 | Teshima | 528/495 |
| 5,527,930 | 6/1996 | Sangokoya | 556/179 |
| 5,565,397 | 10/1996 | Sangokoya | 502/129 |
| 5,602,067 | 2/1997 | Nowlin et al. | 502/104 |
| 5,661,096 | 8/1997 | Winter et al. | 502/103 |
| 5,739,368 | 4/1998 | Krzystowczyk et al. | 556/187 |
| 5,847,177 | 12/1998 | Sangokoya et al. | 556/179 |

FOREIGN PATENT DOCUMENTS

| | | | |
|---|---|---|---|
| 0 393 358 | 10/1990 | European Pat. Off. | 556/179 |
| 0737694 | 10/1996 | European Pat. Off. . | |
| 0776908 | 6/1997 | European Pat. Off. . | |
| 62-148491 | 7/1987 | Japan | 556/179 |
| 3203910 | 9/1991 | Japan . | |
| 4-46906 | 2/1992 | Japan . | |
| 4266891 | 9/1992 | Japan . | |
| 6220128 | 8/1994 | Japan . | |
| 9157319 | 6/1997 | Japan . | |
| 9157320 | 6/1997 | Japan . | |
| 0127795 | 12/1984 | Poland . | |
| 520127 | 10/1976 | U.S.S.R. . | |
| 9616092 | 5/1996 | WIPO . | |

OTHER PUBLICATIONS

Abstract–EUROPATFULL–European Patent EP 463,555 B1 issued Feb. 1996.
Abstract–CAPLUS–of Japanese Patent–JP 09 059289 A2 issued Mar. 1997.
Abstract–CAPLUS–of German Patent DE 19628267 A1 issued Jan. 1997.
Harlan et al., "tert–Butylaluminum Hydroxides and Oxides: Structural Relationship Between Alkylalumoxanes and Alumina Gels", Organometallics, 1994, vol. 13, pp. 2957–2969.

*Primary Examiner*—Mark L. Bell
*Assistant Examiner*—P. Pasterczyk
*Attorney, Agent, or Firm*—Philip M. Pippenger

[57] ABSTRACT

A process is described which comprises heating a methylalumoxane solution in an aromatic hydrocarbon solvent at a temperature of at least 35° C. for at least 0.5 hour in an inert, dry atmosphere such that the resulting heat-treated composition provides, in a supported metallocene catalyst produced using the heat-treated composition, increased activity as compared to the same supported metallocene catalyst produced in the same way except for using a portion of the methylalumoxane solution that has not been heat-treated. Before the heating the methylalumoxane of the solution contains from about 5 to about 35 mole percent unreacted trimethylaluminum, and was formed by partial hydrolysis of trimethylaluminum with free water in an organic solvent.

20 Claims, No Drawings

HEAT TREATED ALUMOXANES

This application discloses and claims subject matter disclosed in our application Ser. No. 08/807,153, filed Feb. 27, 1997, now abandoned, of which the present application is a continuation-in-part. Said application Ser. No. 08/807,153 in turn discloses and claims subject matter disclosed in our prior application Ser. No. 08/644,764, filed May 10, 1996, now U.S. Pat. No. 5,739,368 issued Apr. 14, 1998, of which said application Ser. No. 08/644,764 is a continuation-in-part.

This invention relates generally to hydrocarbylalumoxane compositions (also known as hydrocarbylaluminoxane compositions) and more specifically to improved supported alumoxane/metallocene olefin polymerization catalysts and their preparation.

Hydrocarbylalumoxanes complexed with transition metal compounds, such as metallocenes, have been found to be very effective olefin polymerization catalysts. Methylalumoxanes are especially effective catalyst components in forming both homogeneous and supported catalysts. In addition, certain thermal treatments of methylalumoxane solutions have been reported to provide materials that are useful in heterogeneous ethylene polymerization and that have increased activities when used in forming metallocene catalysts for olefin polymerization. We have found that the activity and other properties of such supported catalysts is improved by heat treating the methylalumoxanes prior to placing them on the support.

In accordance with this invention there is provided a process for preparing a supported alumoxane, said process comprising heat treating an alumoxane and placing the heat treated alumoxane on a support. A supported olefin polymerization catalyst is formed by also adding a transition metal compound such, as a metallocene, to the support.

Also provided are supported alumoxane and alumoxane containing catalyst compositions.

Other embodiments of the invention will be apparent from the ensuing description and appended claims.

Hydrocarbylalumoxanes are formed by the partial hydrolysis of hydrocarbylaluminum compounds and, especially, trialkylaluminums such as trimethylaluminum.

Hydrocarbylalumoxanes may exist in the form of linear, cyclic, caged or polymeric structures with the simplest monomeric compounds being a tetraalkylalumoxane such as tetramethylalumoxane, $(CH_3)_2AlOAl(CH_3)_2$, or tetraethylalumoxane, $(CH_5)_2AlOAl(C_2H_5)_2$. The compounds preferred for use in olefin polymerization catalysts are oligomeric materials, sometimes referred to as polyalkylalumoxanes, which usually contain about 4 to 20 of the repeating units:

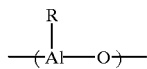

where R is $C_1$–$C_{10}$ alkyl and especially preferred are polymethylalumoxanes (MAOs). Although the linear and cyclic alumoxanes are often noted as having the structures

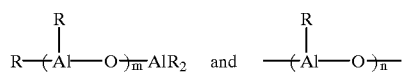

where m and n are integers of 4 or more, the exact configuration of the alumoxanes remains unknown.

Methylalumoxanes can contain some higher alkyl groups to improve their solubility. Such modified methylalumoxanes are described, for example, in U.S. Pat. No. 5,157,008. Besides MAO, non-limiting examples of hydrocarbylalumoxanes for use in the invention include ethylalumoxane (EAO), isobutylalumoxane (IBAO), n-propylalumoxane, n-octylalumoxane, and the like. The hydrocarbylalumoxanes can also contain up to about 20 mole percent (based on aluminum) of moieties derived from amines, alcohols, ethers, esters, phosphoric and carboxylic acids, thiols, alkyl disiloxanes and the like to improve their activity, solubility and/or stability.

The alumoxanes can be prepared as known in the art by the partial hydrolysis of trialkylaluminum compounds. The trialkylaluminum compounds can be hydrolyzed by reacting them with either free water or water containing solids, which can be either hydrates or porous materials which have absorbed water. Because it is difficult to control the reaction by adding water per se, even with vigorous agitation of the mixture, the free water is usually added in the form of a solution or a dispersion in an organic solvent. Suitable hydrates include salt hydrates such as, for example, $CuSO_4 \cdot 5H_2O$, $Al_2(SO_4)_3 \cdot 18H_2O$, $FeSO_4 \cdot 7H_2O$, $AlCl_3 \cdot 6H_2O$, $Al(NO_3)_3 \cdot 9H_2O$, $MgSO_4 \cdot 7H_2O$, $MgCl_2 \cdot 6H_2O$, $ZnSO_4 \cdot 7H_2O$, $Na_2SO_4 \cdot 10H_2O$, $Na_3PO_4 \cdot 12H_2O$, $LiBr \cdot 2H_2O$, $LiCl \cdot 1H_2O$, $LiI \cdot 2H_2O$, $LiI \cdot 3H_2O$, $KF \cdot 2H_2O$, $NaBr \cdot 2H_2O$ and the like and alkali metal or alkaline earth metal hydroxide hydrates such as, for example, $NaOH \cdot H_2O$, $NaOH \cdot 2H_2O$, $Ba(OH)_2 \cdot 8H_2O$, $KOH \cdot 2H_2O$, $CsOH \cdot 1H_2O$, $LiOH \cdot 1H_2O$ and the like. Mixtures of any of the above hydrates can be used. The mole ratios of free water or water in the hydrate or in porous materials such as alumina or silica to total alkyl aluminum compounds in the mixture can vary widely, such as for example from about 2:1 to 1:4, with ratios of from about 4:3 to 1:3.5 being preferred.

Such hydrocarbylalumoxanes and processes for preparing hydrocarbylalumoxanes are described, for example, in U.S. Pat. Nos. 4,908,463; 4,924,018; 5,003,095; 5,041,583; 5,066,631; 5,099,050; 5,157,008; 5,157,137; 5,235,081; 5,248,801, and 5,371,260, whose entire teachings are incorporated herein by reference. The methylalumoxanes contain varying amounts, of from about 5 to 35 mole percent, of the aluminum value as unreacted trimethylaluminum. Preferably, the aluminum content as trimethylaluminum is less than about 23 mole percent of the total aluminum value, and, more preferably, less than about 20 mole percent.

Non-limiting examples of olefin polymerization catalysts include metallocenes and/or transition metal compounds. As used in the specification and claims, the term "metallocene" includes metal derivatives which contain at least one cyclopentadienyl moiety. Suitable metallocenes are well known in the art and include the metallocenes of Groups 3, 4, 5, 6, lanthanide and actinide metals, for example, the metallocenes which are described in U.S. Pat. Nos. 2,864,843; 2,983,740; 4,665,046; 4,874,880; 4,892,851; 4,931,417; 4,952,713; 5,017,714; 5,026,798; 5,036,034; 5,064,802; 5,081,231; 5,145,819; 5,162,278; 5,245,019; 5,268,495; 5,276,208; 5,304,523; 5,324,800; 5,329,031; 5,329,033; 5,330,948, 5,347,025; 5,347,026; and 5,347,752, whose teachings with respect to such metallocenes are incorporated herein by reference.

Non-limiting, illustrative examples of such metallocenes are bis(cyclopentadienyl)-zirconium dimethyl, bis(cyclopentadienyl)zirconium dichloride, bis(cyclopentadienyl)-zirconium monomethylmonochloride, bis(cyclopentadienyl)titanium dichloride, bis(cyclopentadienyl)titanium difluoride, cyclopentadienylzirconium tri-(2-ethylhexanoate), bis(cyclopentadienyl)

zirconium hydrogen chloride, bis(cyclopentadienyl)hafnium dichloride, racemic and meso dimethylsilanylene-bis (methylcyclopentadienyl)hafnium dichloride, racemic dimethylsilanylene-bis(indenyl)hafnium dichloride, racemic ethylene-bis(indenyl)-zirconium dichloride, ($\eta^5$-indenyl) hafnium trichloride, ($\eta^5$-$C_5Me_5$)hafnium trichloride, racemic dimethylsilanylene-bis(indenyl)thorium dichloride, racemic dimethylsilanylenebis(4,7-dimethyl-1-indenyl) zirconium dichloride, racemic dimethylsilanylene-bis (indenyl)uranium dichloride, racemic dimethylsilanylene-bis(2,3,5-trimethyl-1-cyclopentadienyl)zirconium dichloride, racemic dimethylsilanylene(3-methylcyclopentadienyl)hafnium dichloride, racemic dimethylsilanylene-bis(1-(2-methyl4-ethyl)indenyl) zirconium dichloride; racemic dimethylsilanylene-bis(2-methyl-4,5,6,7-tetrahydro-1-indenyl)zirconium dichloride, bis (pentamethylcyclopentadienyl)thorium dichloride, bis (pentamethylcyclopentadienyl)uranium dichloride, (tert-butylamido)dimethyl(tetramethyl-$\eta^5$-cyclopentadienyl) silanetitanium dichloride, (tert-butylamido)dimethyl (tetramethyl-$\eta^5$-cyclopentadienyl)silanechromium dichloride, (tert-butylamido)dimethyl($\eta^5$-cyclopentadienyl) silanetitanium dichloride, (tert-butylamido)dimethyl (tetramethyl-$\eta^5$-cyclopentadienyl)silanemethyltitanium bromide, (tert-butylamido)(tetramethyl-$\eta^5$-cyclopentadienyl)-1,2-ethanediyluraniumdichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylcerium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)methylenetitanium dichloride, (tert-butylamido)dibenzyl(tetramethyl-$\eta^5$-cyclopentadienyl)-silanebenzylvanadium chloride, (benzylamido)dimethyl (indenyl)silanetitanium dichloride, and (phenylphosphido) dimethyl(tetramethyl-$\eta^5$-cyclopentadienyl) silanebenzyltitanium chloride.

Suitable transition metal compounds include the well known Ziegler-Natta catalyst compounds of Group 4–6 metals. Non-limiting illustrative examples of such transition metals include $TiCl_4$, $TiBr4$, $Ti(OC_2H_5)_3Cl$, $Ti(OC_2H_5)C_3$, $Ti(OC_4H_9)_3Cl$, $Ti(OC_3H_7)_2Cl_2$, $Ti(OC_{17})_2Br_2$, $VCl_4$, $VOCl_3$, $VO(OC_2H_5)_3$, $ZrCl_4$, $ZrCl_3(OC_2H_5)$, $Zr(OC_2H_5)_4$, $ZrCl$-$(OC_4H_9)_3$, and the like.

As known in the art the solid support can be any particulate solid, and particularly porous supports. Non-limiting examples include talc, magnesium halides, zeolites, inorganic oxides, and resinous support material such as polyolefins. A preferred support material is an inorganic oxide in finely divided form. Such inorganic oxide support materials include Group IIA, IIIA, IVA or IVB metal oxides such as silica, alumina, silica-alumina and mixtures thereof. Other inorganic oxides that may be employed either alone or in combination with the silica, alumina or silica-alumina are magnesia, titania, zirconia, and the like. Other suitable support materials are finely divided polyolefins such as finely divided polyethylene.

The specific particle size, surface area, pore diameter, pore volume, etc. of the support materials are selected as known in the art. For example, particle sizes of from about 0.1 to 600 micrometers, surface area of from about 50 to 1000 $m^2/g$, pore diameters of from about 50–500 angstroms and pore volumes of from about 0.3 to 5.0 cc/g. The supports can be dehydrated either chemically or by heating at temperatures of from about –100° to 1000° C. in a dry inert gas for 1–24 hours as is known in the art.

In one aspect of the invention, the heat treated alumoxane is combined with the support in the presence of an inert organic solvent. The dry support can be added to a solution of the alumoxane or vice versa. Alternatively, the alumoxane can be combined with a solvent slurry of the carrier. The coating temperature and pressure is not critical and ambient conditions can be used but, preferably the temperature is maintained at from about 25 to 250° C., more preferably 60 to 150° C., and the pressure at from about 5 to 500 psig, preferably 5 to 50 psig, such as by using a closed system. An inert gas can be used to further increase the pressure.

Non-limiting examples of organic solvents for use in the process include aliphatic hydrocarbons such as pentane, isopentane, hexane, cyclohexane, heptane, octane, decane, dodecane, hexadecane, octadecane and the like, with those having carbon numbers of 5 to 10 being preferred, and aromatic hydrocarbons such as benzene, chlorobenzene, toluene, xylene, cumene and the like, with those having carbon numbers of 6 to 20 being preferred. The aromatic solvents are preferred. The amount of solvent used is not critical and is generally chosen to be from about 0.5 to 50, preferably 5 to 50 times, the total weight of coating material and carrier.

The olefin polymerization catalyst can be combined with the support either before, after or simultaneously with the alumoxane. The catalyst can also be pre-reacted with the alumoxane.

The total loading of the catalyst system components on the support and the relative proportions of catalyst materials can vary over a wide range and are chosen based on the particular materials and the polymerization application which are involved. For example, transition metal catalysts are usually employed in amounts of from about 0.01 to 10 mmoles/g of support and the catalyst components are generally used in proportions to provide mole ratios of metal atom in the catalyst to aluminum atom in the alumoxane of from about 0.0002:1 to 0.2:1, although greater or lesser amounts can be used.

The supported catalyst systems which are prepared according to the process of the invention are useful in producing olefin polymers and especially ethylene polymers, propylene polymers, ethylene/α-olefin copolymers, styrene polymers and copolymers and the like.

In accordance with the invention, a solution of the hydrocarbylalumoxane is heat treated at a temperature of at least about 35° C. and preferably from about 45 to 150° C. for at least about 0.5 hour and preferably from 1 to 20 hours prior to applying it to the support.

The invention is further illustrated by, but is not intended to be limited to, the following examples.

EXAMPLE 1

Approximately 600 grams of a clear, 30% by weight solution of methylalumoxane (MAO) in toluene was transferred under nitrogen to a clean, dry, 2 liter reactor which was equipped with an agitator. The agitator was turned on and heated to a temperature of 55° C. by means of a circulating oil heating bath. Samples were taken at 1 hour, 3 hours and 7 hours after the reactor reached 55° C. No gel or any appreciable hazing of the MAO solution was observed either right after the samples were taken or after being stored in a freezer for one week. Any slight hazing disappeared after the samples were warmed to room temperature.

EXAMPLE 2

Example 1 was repeated, except that the treating temperature was 85° C. The seven hour sample showed a slight hazing but no gel appeared. After storage in a freezer, some gel appeared in the seven hour sample. The hazing and gel disappeared after the samples were warmed to room temperature.

EXAMPLE 3

Example 1 was repeated, except that the treating temperature was 80° C. with no agitation. After 8 hours a slight hazing was observed. At 36 hours, a second, clear layer was formed at the top of the reactor (approximately 1–2 centimeters deep) but the bulk of the material was not gelled. The material was removed after 46 hours of heating and stored in a freezer.

Preparation of Supported Catalysts

Supported catalysts were prepared by placing 18.6 gram samples of the heat treated MAO on 11.1 grams of vacuum dried (200° C.) silica along with 0.62 grams of the metallocene catalyst (1,2-ethanebis(indenyl)zirconium dichloride) using 87 grams of toluene as the solvent. After several washes, the dried catalyst product recovery was from 16.4 to 16.9 grams.

Polymerization Activity Testing

Samples of the supported catalysts were used to polymerize ethylene in accordance with the following procedure.

The reactor is heated to 130° C., under a flow of nitrogen, for at least 1 hour prior to polymerization. The reactor is then sealed and purged three times with high pressure nitrogen and cooled to 81.5° C. Isobutane (500 mL) is then added to the reactor and the temperature is controlled at 81.5° C. Ethylene is then added to the reactor to bring the total pressure to 300 psig. The catalyst is prepared in the drybox, by weighing out 25 mg catalyst into the barrel of a syringe. The plunger is replaced. 1 mL of a 25% (w/w) of TIBA in toluene is added to the reactor. A 14 gauge needle is added to the end of the catalyst syringe and is then stuck into a septum sealed vial. Hexene (6.75 g) is weighed into another syringe, the needle is added, and the unit is stored in the same way by piercing the septum sealed vial. The hexene is then added to the reactor through the catalyst addition bomb and rinsed in with approximately 250 mL of isobutane under pressure. The catalyst is then added in a similar fashion and rinsed in with the remaining pressurized isobutane. The pressure of the reactor is increased to 430 psig with ethylene and maintained there feeding ethylene on demand. Once the temperature gets back to 81.5° C., the polymerization is timed for 1 hour. When the polymerization is complete, the isobutane and ethylene are vented off, the reactor is opened, and the polymer is scooped out. The polymer is then weighed and the activity calculated.

The tests were compared with two samples of the same kind of supported catalyst, the only difference being that the methylalumoxane used in making these two samples had not been heat treated. The results are shown in the Table wherein activity is expressed in the conventional manner, i.e., as grams of polyethylene per gram of supported catalyst.

TABLE

| Sample ID[1] | 1A | 1B | 1C | 3A | 3B | Comp. 1 | Comp. 2 |
|---|---|---|---|---|---|---|---|
| Milligrams Sample | 24 | 25 | 25 | 24 | — | — | — |
| Reaction Time, min. | 45 | 60 | 55 | 50 | 60 | 40 | 60 |
| Activity | 6733 | 7370 | 7529 | 6294 | 7215 | 6963 | 6060 |
| Fouling | None | None | None | None | — | — | — |
| Morphology | Good | Good | Good | Good | — | — | — |
| Bulk Density, b/mL | 0.357 | 0.353 | 0.352 | 0.362 | — | — | — |

[1] 1A, 1B, 1C Example 1 samples (55° C.) where A = 1 hr, B = 3 hr, and C = 7 hr samples
3A, 3B Example 3 samples (85° C.) where A = 1 hr, and B = 3 hr samples The results show that up to about a 25 percent increase in activity over the comparisons could be achieved by using the process of the invention, depending upon the heating time and temperature.

The process of heat treatment is believed to provide a more stable MAO product. MAO is found to gel after time under normal storage conditions and more quickly at elevated temperatures. The formation of gel leads to variabilities in performance and unfeasible processing in plants. The process of heat treatment reduces the amount of gel formation and increases the activity of supported catalysts produced using the pretreated MAO products of the invention.

What is claimed is:

1. A process of preparing a supported olefin polymerization catalyst, said process comprising:
   a) heating a methylalumoxane solution in which the solvent is an aromatic hydrocarbon solvent at a temperature of at least 35° C. for at least 0.5 hour in an inert, dry atmosphere; and
   b) combining heat-treated methylalumoxane from a), a catalyst support, and a metallocene olefin polymerization catalyst to form a supported olefin polymerization catalyst, the methylalumoxane and the catalyst support being combined at a temperature of from 25 to 250° C. and a pressure of from 5 to 500 psig;
   with the proviso that the time and the temperature used in the heating in a) are such that the supported olefin polymerization catalyst formed in b) has composition provides, when used in forming a supported metallocene catalyst, a supported increased activity as compared to a supported metallocene catalyst produced in the same way from the same amounts of the same components except that heating pursuant to a) is not used, the methylalumoxane of said solution having been produced before said heating in a) by partial hydrolysis of trimethylaluminum in a mixture consisting of (i) trimethylaluminum in an organic solvent and (ii) free water.

2. A process according to claim 1 wherein said aromatic hydrocarbon solvent is toluene.

3. A process according to claim 1 wherein the heated methylalumoxane solution is agitated during said heating.

4. A process according to claim 3 wherein said aromatic hydrocarbon solvent is toluene.

5. A process according to claim 1 wherein before said heating said solution of methylalumoxane contains from about 5 to about 35 mole percent of trimethylaluminum.

6. A process according to claim 1 wherein before said heating said solution of methylalumoxane contains less than about 23 mole percent of trimethylaluminum.

7. A process according to claim 1 wherein before said heating said solution of methylalumoxane contains less than about 20 mole percent of trimethylaluminum.

8. A process of preparing a supported olefin polymerization catalyst, said process comprising:
   a) agitating and heating a 30% by weight methylalumoxane solution in which the solvent is an aromatic hydrocarbon solvent at a temperature in the range of from about 45 to 150° C. for from 1 to 20 hours in an inert, dry atmosphere, and
   b) combining heat-treated methylalumoxane from a), a catalyst support, and a metallocene olefin polymerization catalyst to form a supported olefin polymerization catalyst, the methylalumoxane and the catalyst support being combined at a temperature of from 25 to 250° C. and a pressure of from 5 to 500 psig;

with the proviso that the time and the temperature used in the heating in a) are such that the supported olefin polymerization catalyst formed in b) has increased activity as compared to a supported metallocene catalyst produced in the same way from the same amounts of the same components except that heating pursuant to a) is not used; wherein before said heating in a) said solution contains from about 5 to about 35 mole percent of unreacted trimethylaluminum, and wherein said methylalumoxane was formed by partial hydrolysis of trimethylaluminum in a mixture consisting of (i) trimethylaluminum in an organic solvent and (ii) free water.

9. A process according to claim 8 wherein said solution is agitated and heated at about 55° C. for a period in the range of from 3 to 7 hours.

10. A process according to claim 9 wherein said aromatic hydrocarbon solvent is toluene.

11. A process according to claim 8 wherein said solution is agitated and heated at about 85° C. for a period in the range of from 1 to 7 hours.

12. A process according to claim 11 wherein said aromatic hydrocarbon solvent is toluene.

13. A process according to claim 1 wherein said catalyst support is a particulate, porous catalyst support.

14. A process according to claim 13 wherein said catalyst support consists essentially of an inorganic oxide catalyst support.

15. A process according to claim 14 wherein said inorganic oxide catalyst support comprises silica, alumina, silica-alumina, or a mixture thereof.

16. A process according to claim 1 or 8 wherein said temperature in b) is from 60 to 150° C. and said pressure in b) is from 5 to 50 psig.

17. A process according to claim 1 or 8 wherein in b) said metallocene olefin polymerization catalyst is combined with said catalyst support before being combined with said heat-treated methylalumoxane.

18. A process according to claim 1 or 8 wherein in b) said metallocene olefin polymerization catalyst is combined with said catalyst support after being combined with said heat-treated methylalumoxane.

19. A process according to claim 1 or 8 wherein in b) said metallocene olefin polymerization catalyst is combined with said catalyst support simultaneously with being combined with said heat-treated methylalumoxane.

20. A process according to claim 8 wherein said catalyst support is a particulate, porous silica catalyst support.

* * * * *